(12) United States Patent
Park

(10) Patent No.: US 11,082,810 B2
(45) Date of Patent: Aug. 3, 2021

(54) GROUP COMMUNICATION SYSTEM AND METHOD FOR MANAGING EMPLOYEES

(71) Applicant: Sang Rae Park, Seoul (KR)

(72) Inventor: Sang Rae Park, Seoul (KR)

( * ) Notice: Subject to any disclaimer, the term of this patent is extended or adjusted under 35 U.S.C. 154(b) by 0 days.

(21) Appl. No.: 16/768,750

(22) PCT Filed: Dec. 20, 2017

(86) PCT No.: PCT/KR2017/015060
§ 371 (c)(1),
(2) Date: Jun. 1, 2020

(87) PCT Pub. No.: WO2019/107653
PCT Pub. Date: Jun. 6, 2019

(65) Prior Publication Data
US 2021/0176605 A1 Jun. 10, 2021

(30) Foreign Application Priority Data
Dec. 1, 2017 (KR) .......................... 10-2017-0164225

(51) Int. Cl.
*H04W 4/10* (2009.01)
*H04B 1/3827* (2015.01)
(Continued)

(52) U.S. Cl.
CPC ............ *H04W 4/10* (2013.01); *H04B 1/3833* (2013.01); *H04W 4/08* (2013.01); *H04W 72/0466* (2013.01)

(58) Field of Classification Search
CPC ..... H04W 4/10; H04W 4/08; H04W 72/0466; H04W 4/02; H04W 4/18; H04W 76/45
See application file for complete search history.

(56) References Cited

U.S. PATENT DOCUMENTS 9,083,811 B2 7/2015 Sharma et al.
2006/0276213 A1* 12/2006 Gottschalk ............ H04W 76/45
455/518

FOREIGN PATENT DOCUMENTS

KR 10-1495411 B1 2/2015
KR 10-2016-0042339 A 4/2016
(Continued)

OTHER PUBLICATIONS

International Search Report dated Aug. 28, 2018 in counterpart International Patent Application No. PCT/KR2017/015060 (2 pages in English and 2 pages in Korean).

*Primary Examiner* — Keith Ferguson
(74) *Attorney, Agent, or Firm* — NSIP Law

(57) ABSTRACT

A group communication system for managing employees according to the present invention is characterized by including: a first two-way radio carried by employees; a second two-way radio carried by managers who manage the employees; and a third two-way radio carried by a supervisor who supervises the managers, wherein each of the first to third two-way radios is provided with a first PTT button and a second PTT button, transmits a voice packet including at least one unique code set to correspond to the first PTT button in a state in which the first PTT button is pressed, transmits a voice packet including a unique code set to correspond to the second PTT button in a state in which the second PTT button is pressed, and upon receiving a voice packet including at least one unique code set to correspond to a receiving group, processes and outputs the received voice packet.

10 Claims, 18 Drawing Sheets

(51) Int. Cl.
*H04W 72/04* (2009.01)
*H04W 4/08* (2009.01)

(56) References Cited

FOREIGN PATENT DOCUMENTS

KR 10-1671780 B1 11/2016
WO WO 2009/142882 A2 11/2009

\* cited by examiner

FIG. 4A

| PTT #1 OR PTT #2 | | | | | |
|---|---|---|---|---|---|
| GROUP | G1 | G2 | G3 | G4 | G5 |
| TRANSMISSION | B,Y,N | B,Y,N | B,Y,N | B,Y,N | B,Y,N |

B : TRANSMIT VOICE PACKET TO GROUP ONLY WHEN CORRESPONDING
GROUP IS SELECTED USING GROUP SELECTION BUTTON

Y : TRANSMIT VOICE PACKET TO CORRESPONDING GROUP REGARDLESS
OF SELECTING GROUP USING GROUP SELECTION BUTTON

N : NOT TRANSMIT VOICE PACKET TO CORRESPONDING GROUP
REGARDLESS OF SELECTING GROUP USING GROUP SELECTION BUTTON

FIG. 4B

| GROUP | G1 | G2 | G3 | G4 | G5 |
|---|---|---|---|---|---|
| RECEPTION | B, Y, N | B, Y, N | B, Y, N | B, Y, N | B, Y, N |

B : RECEIVE VOICE PACKET FROM GROUP ONLY WHEN CORRESPONDING GROUP IS SELECTED USING GROUP SELECTION BUTTON

Y : RECEIVE VOICE PACKET FROM CORRESPONDING GROUP REGARDLESS OF SELECTING GROUP USING GROUP SELECTION BUTTON

N : NOT RECEIVE VOICE PACKET FROM CORRESPONDING GROUP REGARDLESS OF SELECTING GROUP USING GROUP SELECTION BUTTON

FIG. 4C

<GROUP SETTING OF TWO-WAY-RADIO 210_1 OF EMPLOYEE E_1>

| PTT #1 OR PTT #2 | | | | |
|---|---|---|---|---|
| GROUP | G1 | G2 | G3 | G4 |
| TRANSMISSION | Y | N | N | N |
| RECEPTION | Y | N | N | N |

FIG. 4D

<GROUP SETTING OF TWO-WAY-RADIO 220_2 OF MANAGER M_2>

| | PTT #1 | | | | PTT #2 |
|---|---|---|---|---|---|
| GROUP | G1 | G2 | G3 | G4 | G5 |
| TRANSMISSION | N | Y | N | N | Y |
| RECEPTION | N | Y | N | N | Y |

FIG. 4E

<GROUP SETTING OF TWO-WAY-RADIO 230 OF SUPERVISOR S>

| | PTT #1 | | | | PTT #2 |
|---|---|---|---|---|---|
| GROUP | G1 | G2 | G3 | G4 | G5 |
| TRANSMISSION | B | B | B | B | Y |
| RECEPTION | B | B | B | B | Y |

FIG. 13

| DTMF | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | E ( * ) | 0 | F ( # ) | D |

GROUP COMMUNICATION SYSTEM AND METHOD FOR MANAGING EMPLOYEES

CROSS REFERENCE TO RELATED APPLICATIONS

This application is the U.S. National Stage Application of International Application No. PCT/KR2017/015060, filed on Dec. 20, 2017, which claims the benefit under 35 U.S.C. § 119(a) and § 365(b) of Korean Patent Application No. 10-2017-0164225, filed on Dec. 1, 2017, in the Korean Intellectual Property Office, the entire disclosure of which is incorporated herein by reference for all purposes.

TECHNICAL FIELD

The present invention relates to a system and a method for group communication performed by a plurality of two-way radios, and more particularly, to a system and a method for group communication which are adequate for managing employees.

BACKGROUND ART

Two-way radios are devices used for wireless telegraph or a radiotelephony. Using two-way radios, a base station or a relay station for mutual connection is not necessary and it is possible to perform mutual communication without a phone bill being charged. Due to such advantages, two-way radios are generally used in a variety of fields. As a representative example, two-way radios are used as means for group communication in industrial settings, factories, stores, airports, hospitals, event halls, and the like where a plurality of employees work.

FIG. 1 illustrates a configuration of a group communication system for managing employees in a store as an example of an existing group communication system.

Employees E are grouped into a plurality of groups (for example, four groups G1 to G4 and work throughout a store. For each group, a manager M who manages employees of the corresponding group is present. Also, a supervisor S who manages such managers M is present. That is, there is a three-tiered structure including the employees E, the managers M, and the supervisor S. Meanwhile, bell buttons 10 are installed throughout the store to allow a customer to push the bell button 10 and communicate with an employee E or a manger M of a group to which the bell button 10 belongs. Otherwise, buttons are provided on the bell button 10 for each situation (for example, a query for product information such as a price and the like, a query for a display place of a product, a request for an aid for the disabled, and the like) so that a prerecorded voice may be transmitted to the employee E or the manager M. Then, the employee E may be allowed to do his or her work according to the request of the customer or the manager M may recognize a situation and ask the employee E to do work.

The managers M report to the supervisor S or receive instructions from the supervisor S while asking the employees E of the corresponding group to do work. Accordingly, the managers M and the supervisor S may be included in a group G5. The supervisor S gives the managers M instructions but receives a report from the employee E or directly gives the employee E instructions or receives a report from the employee E as necessary.

When the bell button 10 is selectively used as being included or excluded, the above work system among the employees E, the managers M, and the supervisor S is applicable to most industrial settings, factories, airports, hospitals, event halls, and the like in addition to stores. To configure a group communication system adequate for the work system using existing two-way radios, although the employee E may carry one two-way radio 20, the manager M has to carry two two-way radios 31 and 32 including a two-way radio 31 for communicating with employees E who belong to a corresponding group and a two-way radio 32 for communicating with the supervisor S (that is, a two-way radio for the group G5). Also, the supervisor S has to carry five two-way radios 41 to 45 including four two-way radios 41, 42, 43, and 44 for communicating with corresponding group members for each of the groups G1 to G4 and a two-way radio 45 for communicating with the managers M (that is, a two-way radio for the group G5).

As described above, it is very inconvenient for the managers M or the supervisor S to do work while carrying several two-way radios. Also, many two-way radios are necessary and cost a lot. In addition, when the number of groups is great or an intermediate manager, an intermediate supervisor, and the like are added to increase the number of tiers, the number of two-way radios which the manager M or the supervisor S has to carry increases in geometric progression such that it is impossible to configure a required group communication system.

DISCLOSURE

Technical Problem

The present invention is directed to providing a system and a method for group communication in which even when a manager or a supervisor carries only one two-way radio regardless of the number of groups or the number of tiers, it is possible to easily perform group communication between employees and a manager, between the manager and a supervisor, between employees and the supervisor, and the like.

Technical Solution

One aspect of the present invention provides a group communication system for managing employees. The system includes a first two-way radio configured to be carried by an employee who belongs to an nth (n=1, . . . , and N) group when the employees are grouped into first to Nth groups, a second two-way radio configured to be carried by an nth manager who manages employees who belong to the nth group, and a third two-way radio configured to be carried by a supervisor who supervises first to Nth managers. Here, an nth unique code is assigned to the nth group, and an (N+1)th unique code is assigned to an (N+1)th group which includes the first to Nth managers and the supervisor. Also, each of the first to third two-way radios includes a first push-to-talk (PTT) button and a second PTT button, transmits a voice packet including at least one unique code set corresponding to the first PTT button while the first PTT button is pushed, transmits a voice packet including at least one unique code set corresponding to the second PTT button while the second PTT button is pushed, and processes and outputs a received voice packet when the received voice packet includes at least one unique code set corresponding to a reception group.

In the first two-way radio, the nth unique code may be set corresponding to the first PTT button or the second PTT button, and the nth unique code may be set corresponding to the reception group.

In the second two-way radio, the nth unique code may be set corresponding to the first PTT button, the (N+1)th unique code may be set corresponding to the second PTT button, and the nth unique code and the (N+1)th unique code may be set corresponding to the reception group.

The third two-way radio may further include a group selection button, may transmit a voice packet including at least one unique code set corresponding to the first PTT button or at least one unique code selected by the group selection button while the first PTT button is pushed, may transmit the voice packet including the unique code set corresponding to the second PTT button while the second PTT button is pushed, and may process and output a received voice packet when the received voice packet includes the at least one unique code set corresponding to the reception group or the at least one unique code selected by the group selection button.

The third two-way radio may be set to transmit, with respect to each of the first to Nth groups, a voice packet including a unique code of a corresponding group regardless of a selection using the group selection button, be set to transmit the voice packet including the unique code of the corresponding group when the corresponding group is selected by the group selection button, or be set not to insert the unique code of the corresponding group into the voice packet regardless of the selection using the group selection button.

The third two-way radio may be set to process, with respect to each of the first to Nth groups, a received voice packet including a unique code of a corresponding group regardless of a selection using the group selection button, be set to process the received voice packet including the unique code of the corresponding group when the corresponding group is selected by the group selection button, or be set not to process the received voice packet including the unique code of the corresponding group regardless of the selection using the group selection button.

To synchronize at least a part of setting information of the unique codes set corresponding to the first PTT button and the second PTT button with other two-way radios within a certain range, the first two-way radio or the second two-way radio may convert at least the part of setting information into a dual-tone multi-frequency (DTMF) signal and may transmit the DTMF signal through a speaker.

To synchronize at least a part of setting information of the unique codes set corresponding to the first PTT button and the second PTT button with other two-way radios within a certain range, the first two-way radio or the second two-way radio may insert a received signal strength indication (RSSI) reference value into at least the part of setting information and may transmit at least the part of setting information including the RSSI reference value.

Another aspect of the present invention provides a group communication method performed in a group communication system including a first two-way radio configured to be carried by an employee who belongs to an nth (n=1, . . . , and N) group when the employees are grouped into first to Nth groups, a second two-way radio configured to be carried by an nth manager who manages employees who belong to the nth group, and a third two-way radio configured to be carried by a supervisor who supervises first to Nth managers. Here, an nth unique code is assigned to the nth group, and an (N+1)th unique code is assigned to an (N+1)th group which includes the first to Nth managers and the supervisor. Also, each of the first to third two-way radios includes a first push-to-talk (PTT) button and a second PTT button. The method includes transmitting, by the first two-way radio, a voice packet including the nth unique code when the first PTT button or the second PTT button is pushed, processing and outputting, by the first two-way radio, a received voice packet when the received voice packet includes the nth unique code, transmitting, by the second two-way radio, a voice packet including the nth unique code while the first PTT button is pushed, transmitting, by the second two-way radio, a voice packet including the (N+1)th unique code while the second PTT button is pushed; and processing and outputting, by the second two-way radio, a received voice packet when the received voice packet includes the nth unique code or the (N+1)th unique code.

The third two-way radio may further include a group selection button. The method may further include transmitting, by the third two-way radio, a voice packet including at least one selected from first to Nth unique codes by the group selection button while the first PTT button is pushed, transmitting, by the third two-way radio, a voice packet including the (N+1)th unique code while the second PTT button is pushed, and processing and outputting, by the third two-way radio, a received voice packet when the received voice packet includes the at least one selected from the first to Nth unique codes by the group selection button or the (N+1)th unique code.

Advantageous Effects

According to the present invention, even when a manager or a supervisor carries only one two-way radio regardless of the number of groups or the number of tiers, it is possible to easily perform group communication between employees and a manager, between the manager and a supervisor, between employees and the supervisor, and the like.

DESCRIPTION OF DRAWINGS

FIGS. 4A and 4B illustrate available examples of setting transmission groups and setting reception groups according to one embodiment of the present invention.

FIG. 4C illustrates an example of setting a transmission group and a reception group in a first two-way radio 210_1 of an employee E_1 according to one embodiment of the present invention.

FIG. 4D illustrates an example of setting a transmission group and a reception group in a second two-way radio 220_2 of a manager M_2 according to one embodiment of the present invention.

FIG. 4E illustrates an example of setting a transmission group and a reception group in a third two-way radio 230 of a supervisor S according to one embodiment of the present invention.

FIG. 13 is a view illustrating an example of a dual-tone multi-frequency (DTMF) signal used in the setting synchronization process of FIG. 12.

MODES OF THE INVENTION

Figure 1:
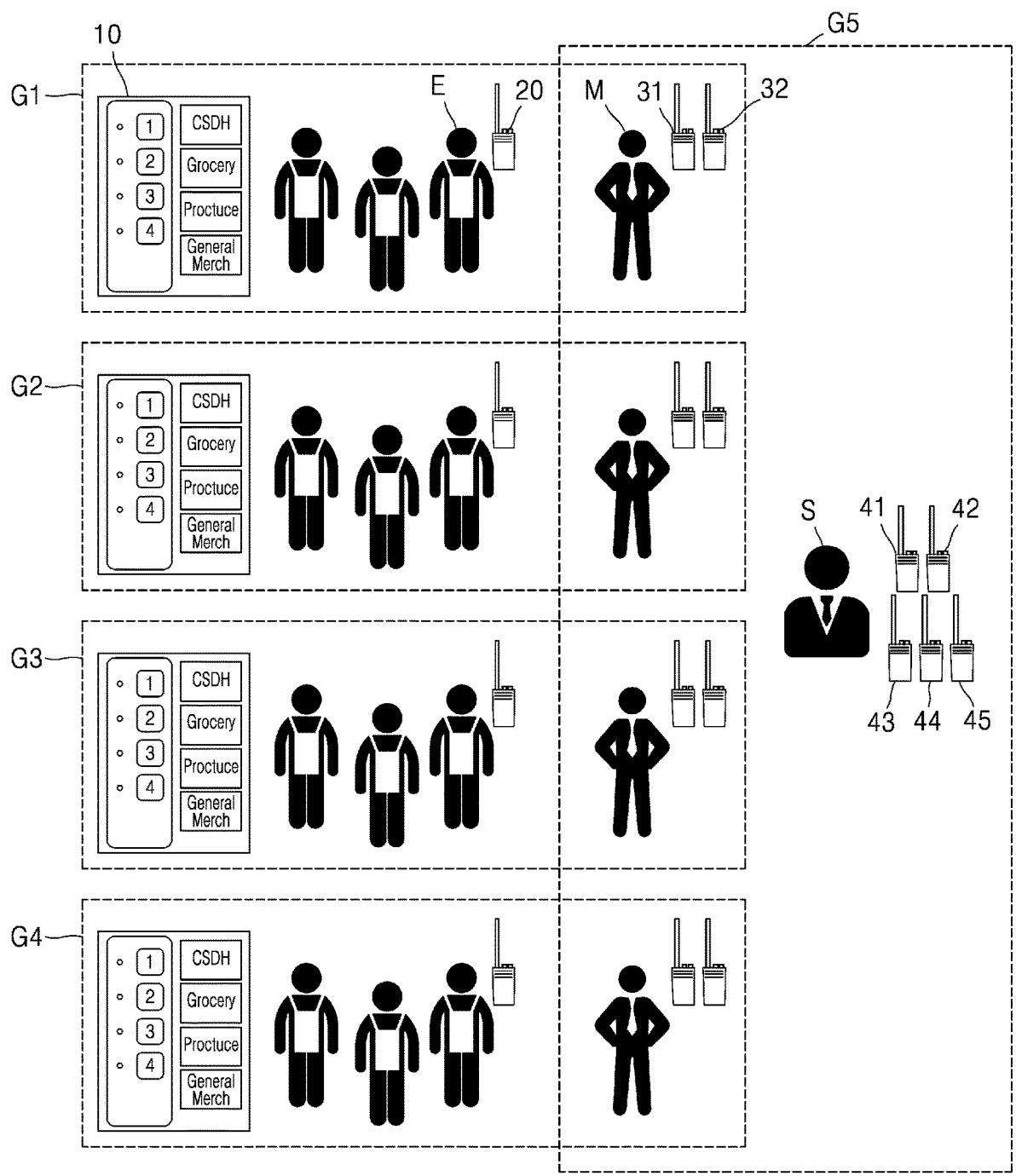
FIG. 1 illustrates a configuration of a group communication system for managing employees in a store as an example of an existing group communication system.

Hereinafter, exemplary embodiments of the present invention will be described in detail with reference to the drawings. Hereinafter, throughout the description and the attached drawings, substantially like elements will be referred to as like reference numerals and a repetitive description thereof will be omitted. Also, in a description of the embodiments of the present invention, a detailed description of well-known functions or components of the related art will be omitted when it is deemed to obscure understanding of the embodiments of the present invention.

Figure 2:
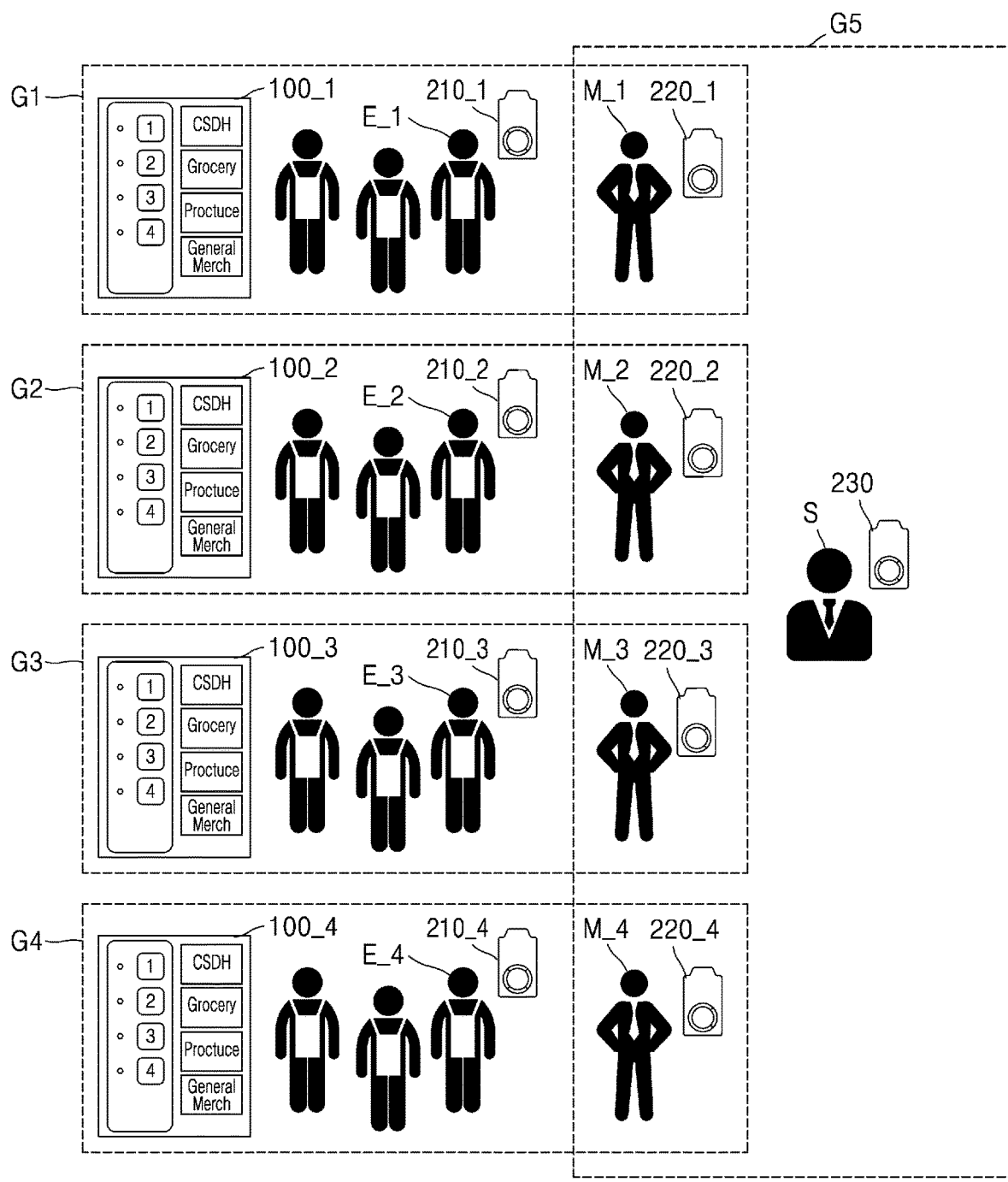
FIG. 2 illustrates a configuration of a group communication system for managing employees according to one embodiment of the present invention.

FIG. 2 illustrates a configuration of a group communication system for managing employees according to one embodiment of the present invention.

Hereinafter, although a three-tiered work system including an employee E, a manager M, and a supervisor S which has been described with reference to FIG. 1 will be described as an example for convenience, the present invention may be applied to a three or more tiered or other work system. Also, although a configuration including a bell button 100 will be described as a group communication system for managing employees in a store for convenience, the present invention is applicable, without the bell button 100 (merely, included as necessary), to industrial settings, a factory, an airport, a hospital, an event hall, and the like.

Generally, employees E may be grouped into first to Nth (N=1, 2, . . . ) groups (hereinafter, employee groups), and a manager M may be included in each of the employee groups. In the embodiment of the present invention, for convenience of description, it is assumed that the employees E are grouped into four groups G1 to G4. Also, a group including the managers M and the supervisor S (hereinafter, referred to as a manager group will be referred to as a group G5 (generally, an (N+1)th group). Throughout the specification and the attached drawings, "_#" of reference numeral "XX_#" designates a group, and in addition to "_#," "XX" of reference numeral "XX_#" designates a random element belonging to the group.

Also, when an intermediate manager, an intermediate supervisor, or the like is added as a low-ranking concept of the supervisor S such that the number of tiers increases, a group including the added intermediate manager or intermediate supervisor may be designated as an (N+2)th group, an (N+3)th group, or the like.

The bell button 100 is installed in places of a store as described above with reference to FIG. 1 so as to allow customers to ask for help such that a customer may communicate with a corresponding employee group by pushing the bell button 100. Otherwise, the bell button 100 may include a button for each situation (for example, a query for product information such as a price and the like, a query for a product display place, a query for an aid for the disabled, and the like) so as to transmit a prerecorded voice to a corresponding employee group. The bell button 100 may be provided as a two-way radio according to an embodiment of the present invention which will be described below.

In the embodiment of the present invention, the employees E carry first two-way radios 210, the managers M carry second two-way radios 220, and the supervisor S carries a third two-way radio 230. In the embodiment of the present invention, the first to third two-way radios 210, 220, and 230 are same two-way radios 200 which will be described below with reference FIG. 3 and may differ in settings to differently operate (for example, to communicate with mutually different groups).

Also, when an intermediate manager, an intermediate supervisor, or the like is added as a low-ranking concept of the supervisor S such that the number of tiers increases, a two-way radio for the added intermediate manager or intermediate supervisor such as a fourth two-way radio, a fifth two-way radio, or the like may be added.

Figure 3:
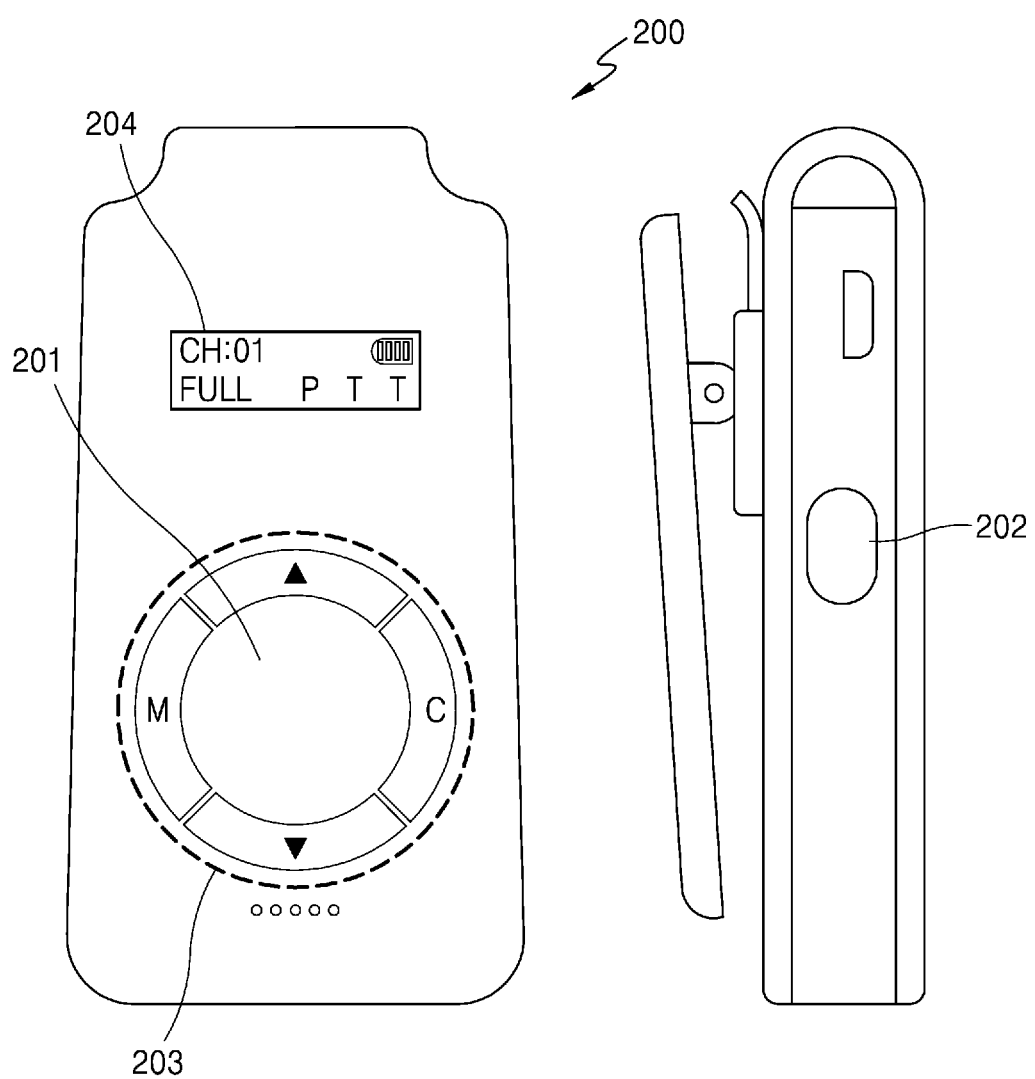
FIG. 3 illustrates a user interface on an exterior of a two-way radio according to one embodiment of the present invention.

FIG. 3 illustrates a user interface on an exterior of the two-way radio according to one embodiment of the present invention.

The two-way radio 200 according to the embodiment of the present invention may perform transmission and reception at the same time using a method such as time division and the like through a full duplex communication function.

The two-way radio 200 transmits a voice packet including at least one unique code which is preset (or selected by a user) when receiving the voice packet and processes (for example, performs digital-analog conversion, amplification, and the like on) the corresponding voice packet only when the voice packet includes at least one preset (or selected by the user) unique code when receiving the voice packet.

The unique code may, for example, be an advanced encryption standard (AES) encryption code, and a unique code field may have a size of 256 bits (32 bytes). Since several unique codes may be included in the unique code field. For example, when one unique code includes 4 bytes, up to eight unique codes may be included.

For group communication, a different unique code may be assigned for each group. For example, when five groups G1 to G5 exist as shown in FIG. 2, first to fifth unique codes are assigned to the five groups G1 to G5, respectively, and unique codes assigned to the groups to which the two-way radios 100, 210, 220, and 230 belong such that communication may be performed for each group.

In general, when employees are grouped into first to Nth groups, first to Nth unique codes are assigned to the first to Nth group and an (N+1)th unique code is assigned to an (N+1)th group including first to Nth managers and a supervisor. Also, when an intermediate manager, an intermediate supervisor, or the like is added as a low-ranking concept of the supervisor such that the number of tiers increases, an (N+2)th unique code, an (N+3)th unique code, or the like may be assigned to an (N+2)th group, an (N+3)th group, or the like including the intermediate manager, the intermediate supervisor, or the like, respectively.

Referring to FIG. 3, the two-way radio 200 includes a first push-to-talk (PTT) button 201 on a front surface, a second PTT button 202 on a side surface, functioning buttons 203, and a display 204.

The two-way radio 200 may have different unique codes set corresponding to the first PTT button 201 and the second PTT button 202. When a first unique code is set to the first PTT button 201 and a second unique code is set to the second PTT button 202, the two-way radio 200 transmits a voice packet including the first unique code while the first PTT button 201 is being pushed, and transmits a voice packet including the second unique code while the second PTT button 202 is being pushed. As different unique codes are set to the first PTT button 201 and the second PTT button 202 as described above, it is possible to communicate with a desired group by selectively pushing one of the first PTT button 201 and the second PTT button 202.

In addition, the functioning buttons 203 may operate as group selection buttons which allow a group (that is, a unique code) to be selected. When a user selects a particular group as a transmission group using the group selection button, the two-way radio 200 may transmit a voice packet including the unique code assigned to the selected group when the first PTT button 201 is pushed. Also, when the user selects a particular group as a reception group using the group selection button, the two-way radio 200 may process and output a voice packet including the unique code assigned to the selected group when the corresponding voice packet is received. As described above, the user may select a desired group using the group selection button and communicate with the corresponding group. Since a variety of combinations of input with respect to the functioning buttons 203 are available, there is no limitation in the number of selectable groups. Also, the group selection button may be implemented as a group selection hot key.

Also, since the functioning buttons 203 may be used while being defined as other PTT buttons in addition to the first PTT button and the second PTT button, the PTT buttons are not limited to the first PTT button and the second PTT button. FIGS. 4A and 4B illustrate available examples of setting transmission groups and setting reception groups according to one embodiment of the present invention. Here, in the drawings, PTT #1 and PTT #2 refer to the first PTT button 201 and the second PTT button 202, respectively.

The first PTT button 201 or the second PTT button 202 may be set to communicate with at least one of several groups according to group selection by the user using the group selection button or previous group settings.

In the case of transmission groups, "B" means performing transmission to a group by pushing the PTT button (that is, inserting a unique code of a group into a voice packet) only when the corresponding group is selected using the group selection button, "Y" means performing transmission to a group by pushing the PTT button regardless of whether the corresponding group is selected using the group selection button, and "N" means not performing transmission to a group regardless of whether the corresponding group is selected using the group selection button.

In the case of reception groups, "B" means receiving a voice packet from a group (that is, processing a voice packet including a unique code of a group) only when the corresponding group is selected using the group selection button, "Y" means receiving a voice packet from a group regardless of whether the corresponding group is selected using the group selection button, and "N" means not receiving a voice packet from a group regardless of whether the corresponding group is selected using the group selection button.

Referring back to FIG. 2, the first two-way radio 210 of the employee E (as well as the bell button 100) is set to communicate with a corresponding employee group. For example, a first radio 210_1 of an employee E_1 of the group G1 is set to communicate with other employees and a manager M_1 who belong to the group G1.

FIG. 4C illustrates an example of setting a transmission group and a reception group in the first two-way radio 210_1 of the employee E_1 according to one embodiment of the present invention.

In the case of the transmission group, corresponding to the first PTT button 201 or the second PTT button 202, the group G1 is set "Y." In other words, regardless of group selection, it is set to transmit a voice packet including a first unique code when the first PTT button 201 or the second PTT button 202 is pushed. In the case of the reception group, the group G1 is set "Y." In other words, regardless of group selection, it is set to process and output the voice packet including the first unique code. Accordingly, the employee E_1 of the group G1 may communicate with other employees and the manager M_1 who belong to the group G1 by pushing the first PTT button 201 or the second PTT button 202.

Referring back to FIG. 2, the second two-way radio 220 of the manager M is set to communicate with a corresponding employee group or the manager group G5 depending on selecting the first PTT button 201 or the second PTT button 202. For example, a second two-way radio 220_2 of a manager M_2 of the group G2 is set to communicate with employees E_2 who belong to the group G2 or to communicate with the manager group G5, that is, other managers and the supervisor S depending on selecting the first PTT button 201 or the second PTT button 202.

FIG. 4D illustrates an example of setting the transmission and reception groups in the second two-way radio 220_2 of the manager M_2 of the group G2 according to one embodiment of the present invention.

In the case of the transmission group, the group G2 is set "Y" corresponding to the first PTT button 201, and the group G5 is set "Y" corresponding to the second PTT button 202. In other words, regardless of group selection, it is set to transmit a voice packet including a second unique code when the first PTT button 201 is pushed and it is set to transmit a voice packet including a fifth unique code when the second PTT button 202 is pushed. In the case of the reception group, the groups G2 and G5 are set "Y." In other words, regardless of group selection, it is set to process and output the voice packet including the second unique code or the fifth unique code. Accordingly, the manager M_2 of the group G2 may communicate with the employees E_2 who belong to the group G2 by pushing the first PTT button 201 or communicate with other managers M_1, M_3, and M_4 and the supervisor S by pushing the second PTT button 202.

Referring back to FIG. 3, the third two-way radio 230 of the supervisor S is set to communicate with a desired employee group or the manager group G5 depending on group selection and selecting the first PTT button 201 or the second PTT button 202. For example, it is set, when the supervisor S selects any group using the group selection button, to communicate with the employees E and the manager M who belong to the selected group or to communicate with the manager group G5, that is, the managers M_1, M_2, M_3, and M_4 depending on selecting the first PTT button 201 or the second PTT button 202.

FIG. 4E illustrates an example of setting the transmission and reception groups in the third two-way radio 230 of the supervisor S according to one embodiment of the present invention.

In the case of the transmission group, the groups G1 to G4 are set "B" corresponding to the first PTT button 201, and the group G5 is set "Y" corresponding to the second PTT button 202. In other words, it is set to transmit a voice packet including a unique code of at least one group selected among the groups G1 to G4 by the supervisor S using the group selection button when the first PTT button 201 is pushed. Also, it is set to transmit a voice packet including the fifth unique code when the second PTT button 202 is pushed. In the case of the reception group, all the groups G1 to G4 are set "B" and the group G5 is set "Y." In other words, it is set to process and output a voice packet including the fifth unique code or a unique code of at least one group selected among the groups G1 to G4 by the supervisor S using the group selection button. Accordingly, the supervisor S may select an employee group and then communicate with employees and a manager who belong to the corresponding employee group by pushing the first PTT button 201 or communicate with the managers M_1, M_2, M_3, and M_4 of the manager group by pushing the second PTT button 202.

Figure 5:
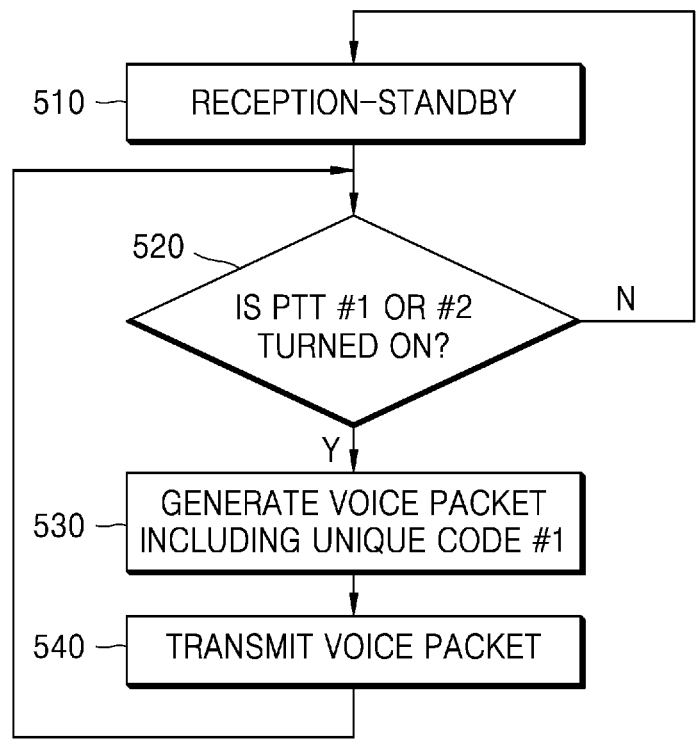
FIG. 5 is a flowchart illustrating a transmission operation of the first two-way radio 210_1 of the employee E_1 according to the setting of FIG. 4B.

FIG. 5 is a flowchart illustrating a transmission operation of the first two-way radio 210_1 of the employee E_1 according to the setting of FIG. 4B.

In a reception-standby mode (510), when a push (ON) to the first PTT button 201 or the second PTT button 202 is sensed (520), the first two-way radio 210_1 generates a voice packet including the first unique code (530) and transmits the generated voice packet (540). In operation 520, when the push to the first PTT button 201 or the second PTT button 202 is not sensed, the first two-way radio 210_1 returns to the reception-standby mode (510).

Figure 6:
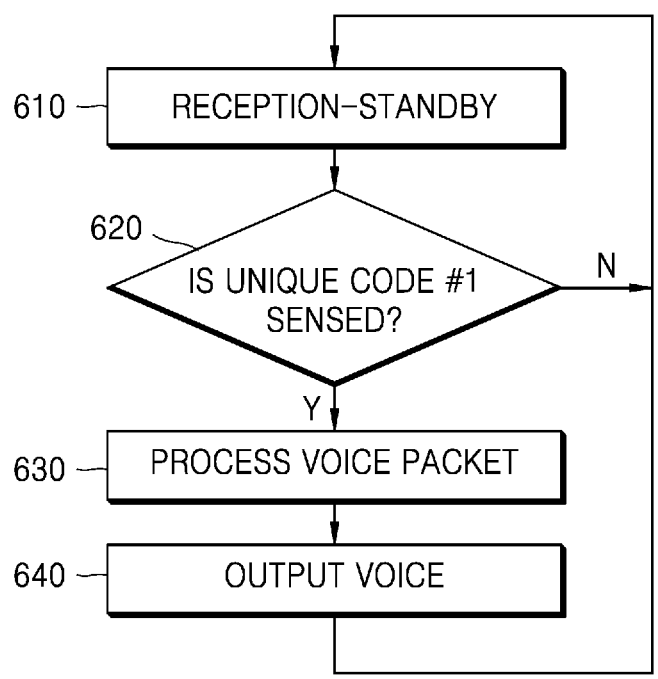
FIG. 6 is a flowchart illustrating a reception operation of the first two-way radio 210_1 of the employee E_1 according to the setting of FIG. 4B.

FIG. 6 is a flowchart illustrating a reception operation of the first two-way radio 210_1 of the employee E_1 according to the setting of FIG. 4B.

In a reception-standby mode (610), when the first unique code is sensed from a received voice packet (620), the first two-way radio 210_1 processes (for example, performs digital-analog conversion, amplification, and the like on) the voice packet (630) and outputs a voice through a speaker (640). In operation 620, when the first unique code is not sensed, the first two-way radio 210_1 returns to the reception-standby mode (610).

Figure 7:
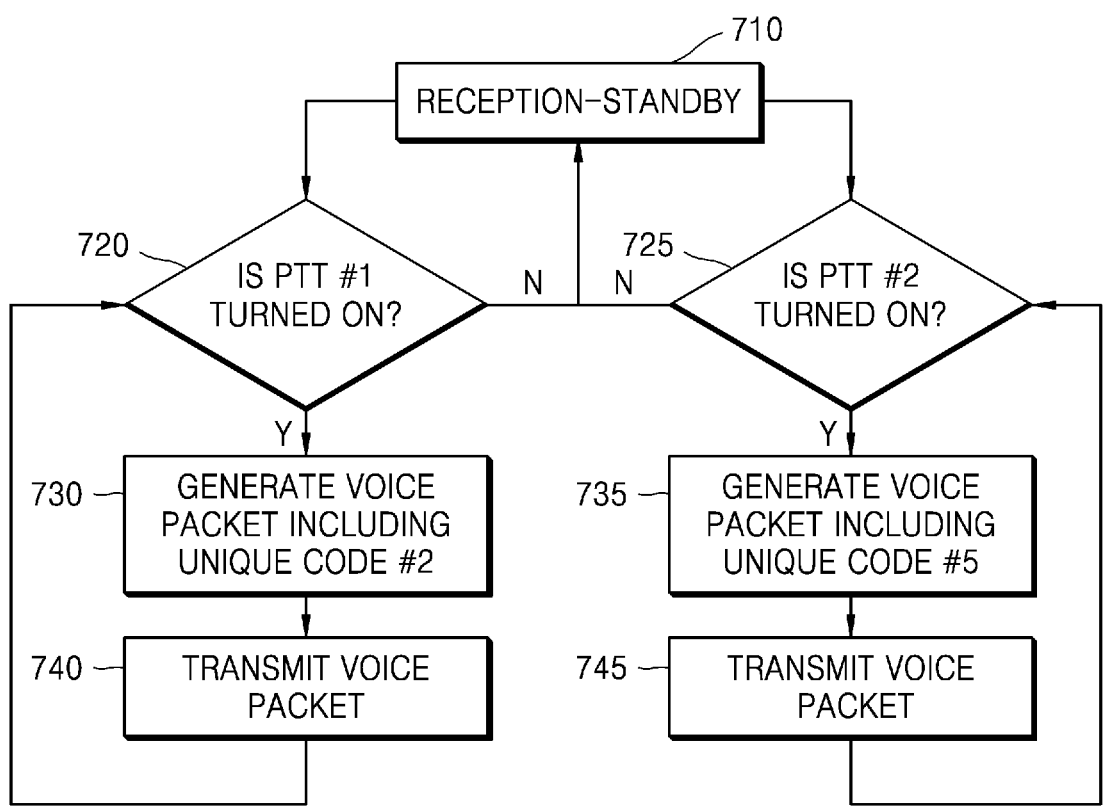
FIG. 7 is a flowchart illustrating a transmission operation of the second two-way radio 220_2 of the manager M_2 according to the setting of FIG. 4C.

FIG. 7 is a flowchart illustrating a transmission operation of the second two-way radio 220_2 of the manager M_2 according to the setting of FIG. 4C.

In a reception-standby mode (710), when a push (ON) to the first PTT button 201 is sensed (720), the second two-way radio 220_2 generates a voice packet including the second unique code (730) and transmits the generated voice packet (740). In operation 720, when the push to the first PTT button 201 is not sensed, the second two-way radio 220_2 returns to the reception-standby mode (710).

Meanwhile, in the reception-standby mode (710), when a push (ON) to the second PTT button 202 is sensed (725), the second two-way radio 220_2 generates a voice packet including the fifth unique code (735) and transmits the generated voice packet (745). In operation 725, when the push to the second PTT button 202 is not sensed, the second two-way radio 220_2 returns to the reception-standby mode (710).

Figure 8:
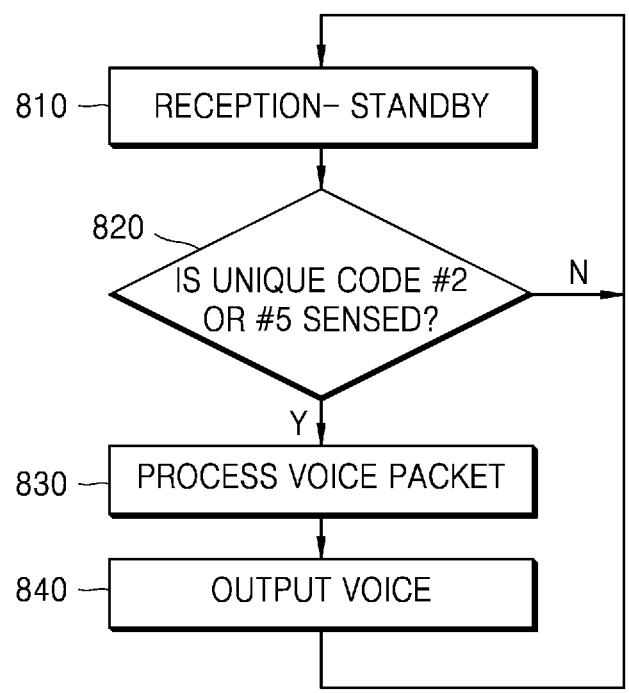
FIG. 8 is a flowchart illustrating a reception operation of the second two-way radio 220_2 of the manager M_2 according to the setting of FIG. 4C.

FIG. 8 is a flowchart illustrating a reception operation of the second two-way radio 220_2 of the manager M_2 according to the setting of FIG. 4C.

In a reception-standby mode (810), when the second unique code or the fifth unique code is sensed from a received voice packet (820), the second two-way radio 220_2 processes (for example, performs digital-analog conversion, amplification, and the like on) the voice packet (830) and outputs a voice through a speaker (840). In operation 820, when the second unique code or the fifth unique code is not sensed, the second two-way radio 220_2 returns to the reception-standby mode (810).

Figure 9:
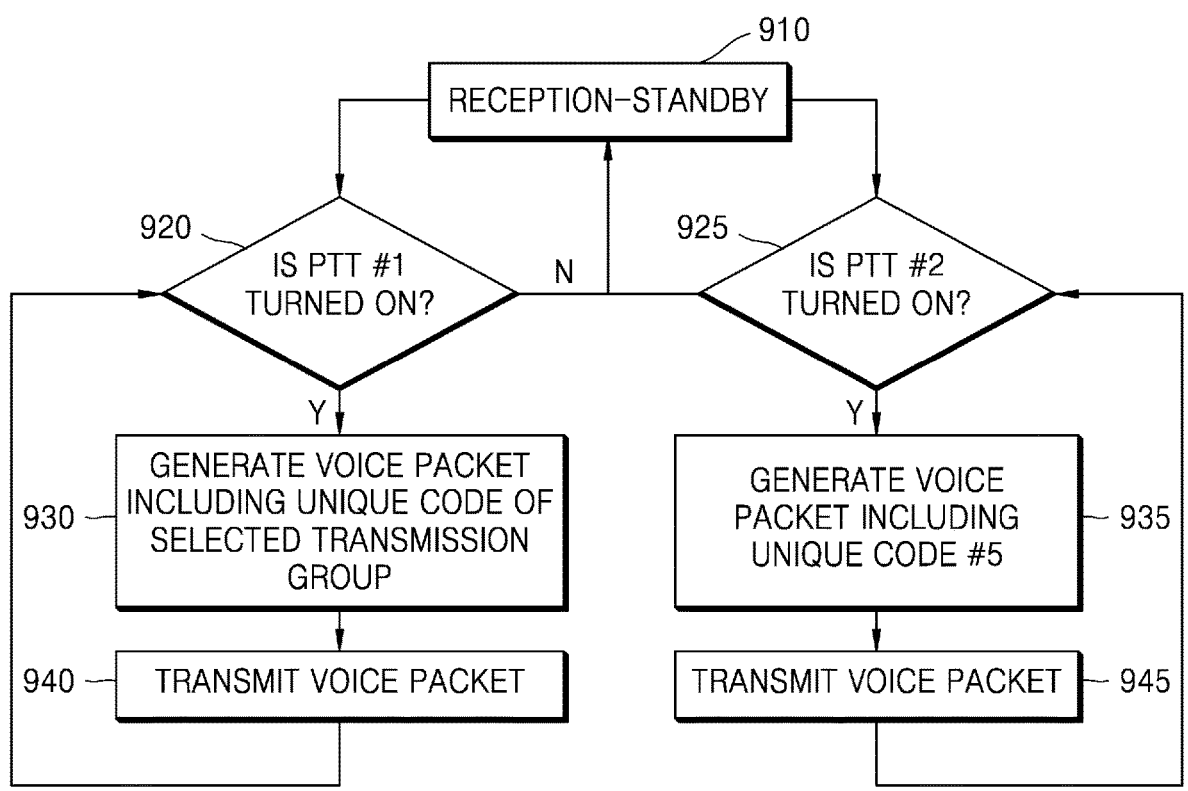
FIG. 9 is a flowchart illustrating a transmission operation of the third two-way radio 230 of the supervisor S according to the setting of FIG. 4D.

FIG. 9 is a flowchart illustrating a transmission operation of the third two-way radio 230 of the supervisor S according to the setting of FIG. 4D. Here, it is assumed that the supervisor S selects at least one transmission group using the group selection button of the third two-way radio 230.

In a reception-standby mode (910), when a push (ON) to the first PTT button 201 is sensed (920), the third two-way radio 230 generates a voice packet including a unique code of the selected transmission group (930) and transmits the generated voice packet (940). In operation 920, when the push to the first PTT button 201 is not sensed, the third two-way radio 230 returns to the reception-standby mode (910).

Meanwhile, in the reception-standby mode (910), when a push (ON) to the second PTT button 202 is sensed (925), the third two-way radio 230 generates a voice packet including the fifth unique code (935) and transmits the generated voice packet (945). In operation 925, when the push to the second PTT button 202 is not sensed, the third two-way radio 230 returns to the reception-standby mode (910).

Figure 10:
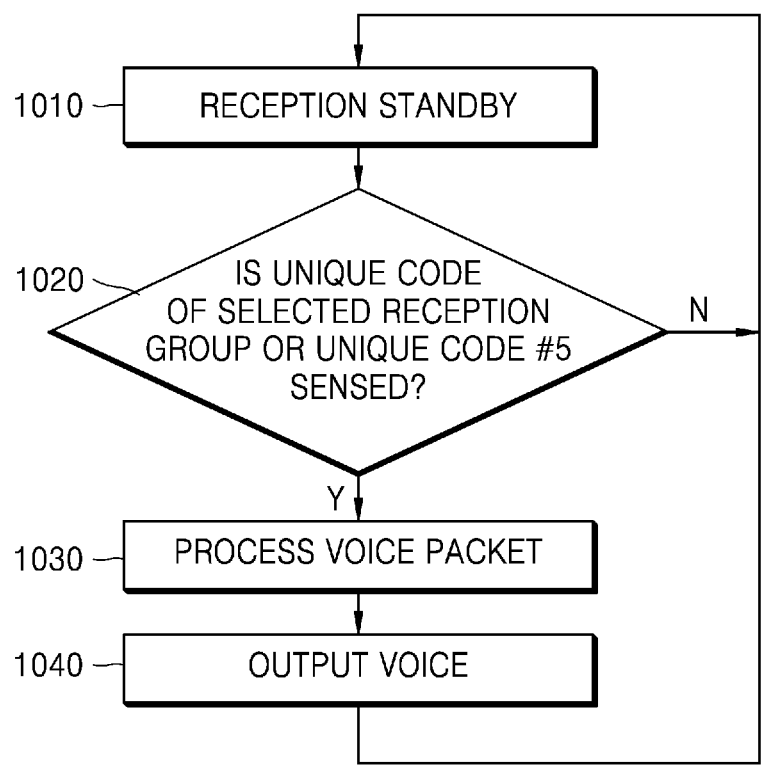
FIG. 10 is a flowchart illustrating a reception operation of the third two-way radio 230 of the supervisor S according to the setting of FIG. 4D.

FIG. 10 is a flowchart illustrating a reception operation of the third two-way radio 230 of the supervisor S according to the setting of FIG. 4D. Here, it is assumed that the supervisor S selects at least one reception group using the group selection button of the third two-way radio 230.

In a reception-standby mode (1010), when the fifth unique code or a unique code of the reception group selected by the supervisor S is sensed from a received voice packet (1020), the third two-way radio 230 processes (for example, performs digital-analog conversion, amplification, and the like on) the voice packet (1030) and outputs a voice through a speaker (1040). In operation 1020, when the fifth unique code or the unique code of the selected reception group is not sensed, the third two-way radio 230 returns to the reception-standby mode (1010).

Also, the two-way radio 200 according to the embodiment of the present invention may transmit setting information such as a unique code, a transmission group, a reception group, and the like to other two-way radios to synchronize setting information with other two-way radios, receive setting information from other two-way radios, and automatically set the unique code, transmission group, the reception group, and the like according to the received setting information. As an example, when it is necessary to set all two-way radios of the employees E_1 of the group G1 as shown in FIG. 4B, one two-way radio (two-way radio of a setting side) is set as shown in FIG. 4B and then other two-way radios (two-way radios of a side to be set) are located within a certain distance (for example, several meters) from the two-way radio of the setting side. Next, when a two-way radio on the setting side transmits setting information, two-way radios on the side to be set may receive the setting information and automatically set a unique code, a transmission group, a reception group, and the like according to the received setting information. A method of synchronizing settings among two-way radios according to an embodiment of the present invention will be described in detail with reference to FIGS. 11 to 14.

Figure 11:
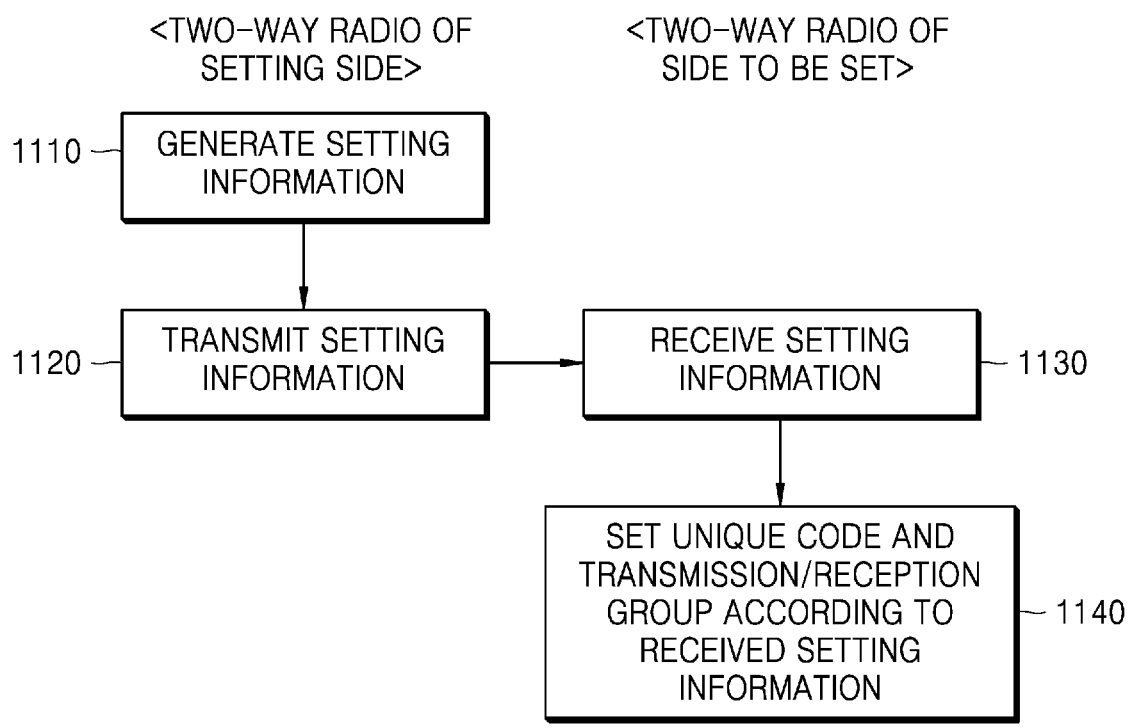
FIG. 11 is a flowchart illustrating a process of synchronizing settings among two-way radios according to one embodiment of the present invention.

FIG. 11 is a flowchart illustrating a process of synchronizing settings among two-way radios according to one embodiment of the present invention.

A two-way radio on a setting side generates setting information according to current setting states of a unique code, a transmission group, a reception group, and the like (1110) and transmits the setting information (1120).

Two-way radios on a side to be set receive the setting information from the two-way radio on the setting side (1130) and set a unique code, a transmission group, a reception group, and the like according to the received setting information (1140). Before operation 1140, an operation of approving, by a user, whether the received setting information is applied may be further included.

Figure 12:
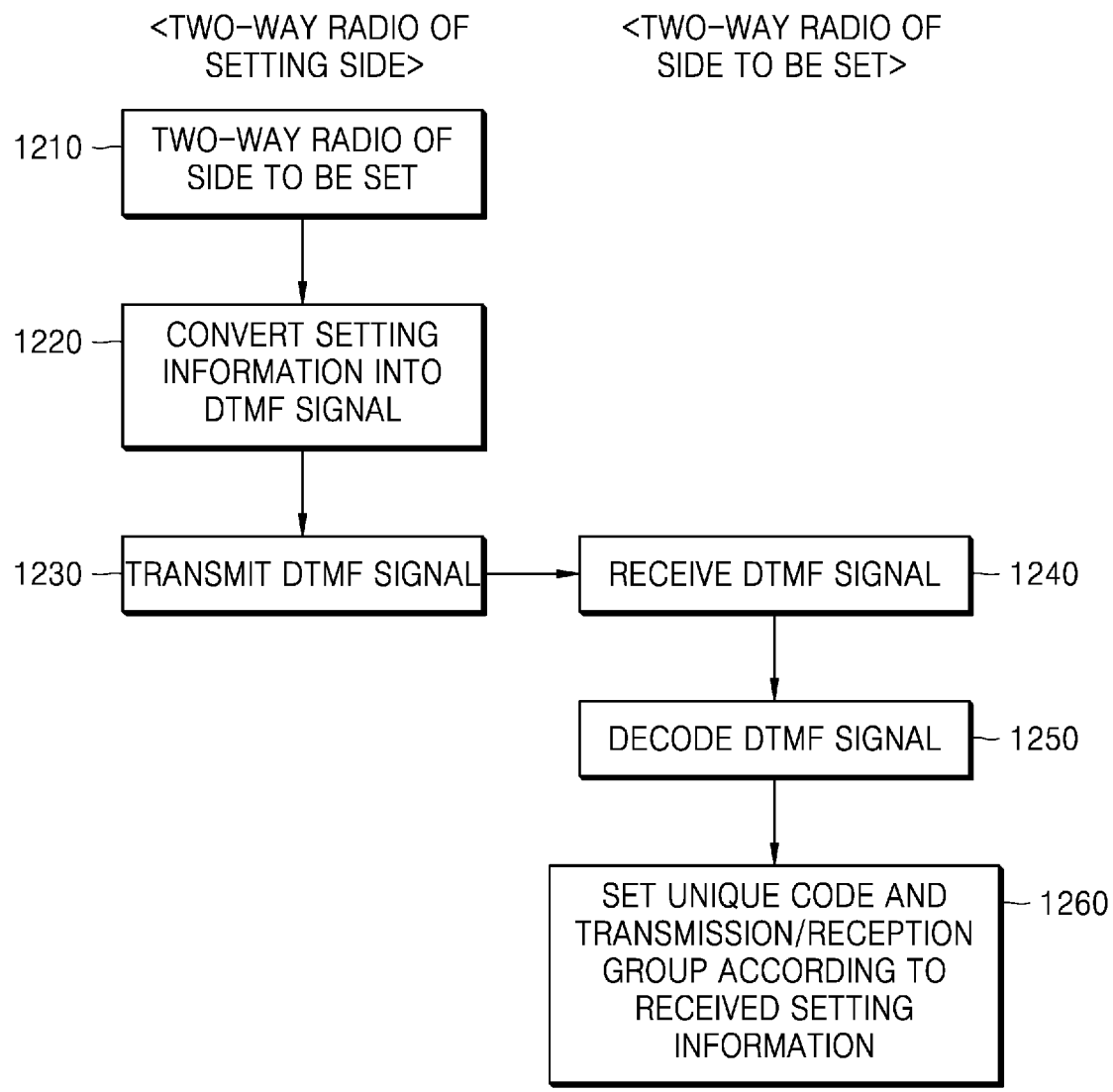
FIG. 12 is a flowchart illustrating a process of synchronizing settings among two-way radios according to another embodiment of the present invention.

FIG. 12 is a flowchart illustrating a process of synchronizing settings among two-way radios according to another embodiment of the present invention.

A two-way radio on a setting side generates setting information according to current setting states of a unique code, a transmission group, and a reception group, and the like (1210), converts the setting information into a dual-tone multi-frequency (DTMF) signal (1220), and then transmits the DTMF signal through a speaker provided therein (1230). Since a voice signal output through a speaker reaches only a short distance, it is possible to allow the DTMF signal to reach only two-way radios on a side to be set within a certain range.

For example, when the DTMF signal has frequency components of a 4×4 matrix, a hexadecimal value may be expressed with an overlapped tone (a combination of two frequencies). FIG. 13 illustrates an example of the DTMF signal, in which each row indicates a low frequency component and each column indicates a high frequency component. In this case, hexadecimal numbers 0 to F may be expressed using one DTMF signal. Depending on an amount of data, several DTMF signals may be sequentially transmitted.

Two-way radios on a side to be set receive the DTMF signal through a microphone provided therein (1240), obtains the setting information by decoding the DTMF signal (1250), and then sets a unique code, a transmission group, a reception group, and then the like according to the corresponding setting information (1260). Before operation 1260, an operation of approving, by a user, whether the received setting information is applied may be further included.

Figure 14:
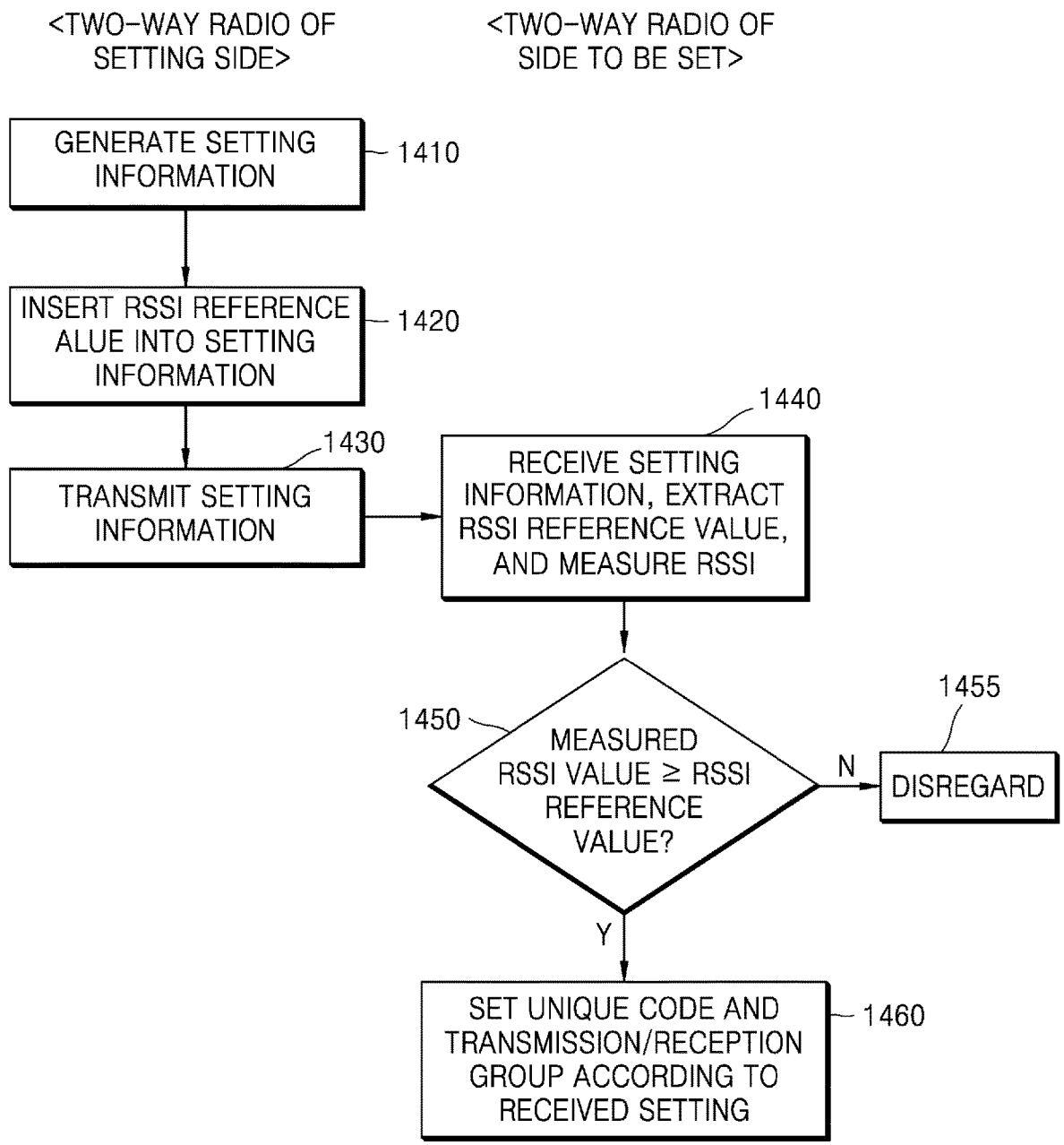
FIG. 14 is a flowchart illustrating a process of synchronizing settings among two-way radios according to still another embodiment of the present invention.

FIG. 14 is a flowchart illustrating a process of synchronizing settings among two-way radios according to still another embodiment of the present invention.

A two-way radio on a setting side generates setting information according to current setting states of a unique code, a transmission group, a reception group, and the like (1410), inserts a certain received signal strength indication (RSSI) reference value into the setting information (1420), and then transmits the setting information including the RSSI reference value (1430).

In the embodiment, the two-way radio on the setting side sends the RSSI reference value in order to allow only two-way radios within a certain range to apply the setting information received from the two-way radio on the setting side by comparing a measured RSSI value of a signal received at each of two-way radios on a side to be set with the RSSI value received from the two-way radio on the setting side.

When a measured RSSI value of a case in which the two-way radio on the setting side and the two-way radios on the side to be set come very close to each other is referred to as a maximum RSSI value, the RSSI reference value may be determined as a certain rate (for example, 90%) of the maximum RSSI value depending on a distance between the two-way radio and the two-way radios on the side to be set.

When the setting information is received, the two-way radios on the side to be set extract the RSSI reference value from the setting information and measure an RSSI value of the received signal (1440). Since the measured RSSI value is greater than or equal to the RSSI reference value (1450) when the two-way radios on the side to be set are within a certain range from the two-way radio on the setting side, a unique code, a transmission group, a reception group, and the like are set according to the received setting information (1460). When the measured RSSI value is smaller than the RSSI reference value, the received setting information is disregarded (1455). Before operation 1460, an operation of approving, by a user, whether the received setting information is applied may be further included.

The two-way radio according to the embodiments of the present invention may include a processor, a permanent storage such as a memory and a disk drive which stores and executes program data, a communication port which communicates with an external device, a touch panel, a user interface device such as a button, a key, and the like. Methods implemented as software modules or algorithms are computer-readable codes or program instructions which are executable by the processor and may be stored in a computer-readable recording medium. Here, the computer-readable recording medium includes magnetic storage media (for example, a read-only memory (ROM), a random-access memory (RAM), a floppy disk, a hard disk, and the like), optical reading media (for example, a compact disc-ROM (CD-ROM) and a digital versatile disc (DVD)), and the like. The computer-readable recording medium may be distributed in computer systems connected through a network, and computer-readable codes may be stored and executed in a distributed fashion. A medium is readable by a computer, is stored in a memory, and is executable by a processor.

Embodiments of the present invention may be shown as functional block components and a variety of processing operations. The functional blocks may be implemented through a variety of numbers of hardware and/or software components which implement particular functions. For example, an embodiment may employ integrated circuit components such as a memory, processing, logic, look-up table, and the like which are capable of performing a variety functions under the control of one or more microprocessors or other control devices. Like the components of the present invention being executable using software programming or software elements, the embodiment may include a data structure, processes, routines, or a variety of algorithms which are implemented through a combination of other programming components and may be implemented as programming or scripting languages such as C, C++, Java, an assembler, and the like. Functional aspects may be implemented as an algorithm executed by one or more processors. Also, the embodiment may employ a related art for electronic environment settings, signal processing, data processing, and/or the like. The terms such as "mechanism," "element," "means," and "component" may be widely used and are not limited to mechanical and physical components. The terms may include the meaning of a series of routines of software in connection with a processor and the like.

Particular executions described in the embodiment are merely examples, and the scope of the embodiment is not limited to any methods. For a concise specification, a description of conventional electronic components, control systems, software, and other functional aspects of the systems will be omitted. Also, connection or connection members of lines between components shown in the drawings are exemplarily shown as functional connection and/or physical or circuit connections and may be a variety of replaceable or additional functional connections, physical connection, or circuit connections in a real apparatus. Also, unless stated in detail such as "essential," "significant," and the like, a component may not be essential for applying of the present invention.

The exemplary embodiments of the present invention have been described above. It should be understood by one of ordinary skill in the art that the present invention may be implemented as a modified form without departing from the essential features of the present invention. Therefore, the disclosed embodiments should be considered not in a limitative view but a descriptive view. The scope of the present invention will be shown in the claims not in the above description, and all differences within an equivalent range thereof should be construed as being included in the present invention.

The invention claimed is:

1. A group communication system for managing employees, comprising:
   a first two-way radio configured to be carried by an employee who belongs to an nth (n=1, . . . , and N) group when the employees are grouped into first to Nth groups;
   a second two-way radio configured to be carried by an nth manager who manages employees who belong to the nth group; and
   a third two-way radio configured to be carried by a supervisor who supervises first to Nth managers,
   wherein an nth unique code is assigned to the nth group, and an (N+1)th unique code is assigned to an (N+1)th group which comprises the first to Nth managers and the supervisor, and
   wherein each of the first to third two-way radios comprises a first push-to-talk (PTT) button and a second PTT button, transmits a voice packet comprising at least one unique code set corresponding to the first PTT button while the first PTT button is pushed, transmits a voice packet comprising at least one unique code set corresponding to the second PTT button while the second PTT button is pushed, and processes and outputs a received voice packet when the received voice packet comprises at least one unique code set corresponding to a reception group.

2. The group communication system of claim 1, wherein in the first two-way radio, the nth unique code is set corresponding to the first PTT button or the second PTT button, and the nth unique code is set corresponding to the reception group.

3. The group communication system of claim 1, wherein in the second two-way radio, the nth unique code is set corresponding to the first PTT button, the (N+1)th unique code is set corresponding to the second PTT button, and the nth unique code and the (N+1)th unique code are set corresponding to the reception group.

4. The group communication system of claim 1, wherein the third two-way radio further comprises a group selection button, transmits a voice packet comprising at least one unique code set corresponding to the first PTT button or at least one unique code selected by the group selection button while the first PTT button is pushed, transmits the voice packet comprising the unique code set corresponding to the second PTT button while the second PTT button is pushed, and processes and outputs a received voice packet when the received voice packet comprises the at least one unique code set corresponding to the reception group or the at least one unique code selected by the group selection button.

5. The group communication system of claim 4, wherein the third two-way radio is set to transmit, with respect to each of the first to Nth groups, a voice packet comprising a unique code of a corresponding group regardless of a selection using the group selection button, is set to transmit the voice packet comprising the unique code of the corresponding group when the corresponding group is selected by the group selection button, or is set not to insert the unique code of the corresponding group into the voice packet regardless of the selection using the group selection button.

6. The group communication system of claim 4, wherein the third two-way radio is set to process, with respect to each of the first to Nth groups, a received voice packet comprising a unique code of a corresponding group regardless of a selection using the group selection button, is set to process the received voice packet comprising the unique code of the corresponding group when the corresponding group is selected by the group selection button, or is set not to process the received voice packet comprising the unique code of the corresponding group regardless of the selection using the group selection button.

7. The group communication system of claim 1, wherein to synchronize at least a part of setting information of the unique codes set corresponding to the first PTT button and the second PTT button with other two-way radios within a certain range, the first two-way radio or the second two-way radio converts at least the part of setting information into a dual-tone multi-frequency (DTMF) signal and transmits the DTMF signal through a speaker.

8. The group communication system of claim 1, wherein to synchronize at least a part of setting information of the unique codes set corresponding to the first PTT button and the second PTT button with other two-way radios within a certain range, the first two-way radio or the second two-way radio inserts a received signal strength indication (RSSI) reference value into at least the part of setting information and transmits at least the part of setting information including the RSSI reference value.

9. A group communication method performed in a group communication system comprising a first two-way radio configured to be carried by an employee who belongs to an nth (n=1, . . . , and N) group when the employees are grouped into first to Nth groups, a second two-way radio configured to be carried by an nth manager who manages employees who belong to the nth group, and a third two-way radio configured to be carried by a supervisor who supervises first to Nth managers,
   wherein an nth unique code is assigned to the nth group, and an (N+1)th unique code is assigned to an (N+1)th group which comprises the first to Nth managers and the supervisor, and
   wherein each of the first to third two-way radios comprises a first push-to-talk (PTT) button and a second PTT button,
   the method comprising:
   transmitting, by the first two-way radio, a voice packet comprising the nth unique code when the first PTT button or the second PTT button is pushed;

processing and outputting, by the first two-way radio, a received voice packet when the received voice packet comprises the nth unique code;

transmitting, by the second two-way radio, a voice packet comprising the nth unique code while the first PTT button is pushed;

transmitting, by the second two-way radio, a voice packet comprising the (N+1)th unique code while the second PTT button is pushed; and processing and outputting, by the second two-way radio, a received voice packet when the received voice packet comprises the nth unique code or the (N+1)th unique code.

10. The group communication method of claim 9, wherein the third two-way radio further comprises a group selection button, the method further comprising:

transmitting, by the third two-way radio, a voice packet comprising at least one selected from first to Nth unique codes by the group selection button while the first PTT button is pushed;

transmitting, by the third two-way radio, a voice packet comprising the (N+1)th unique code while the second PTT button is pushed; and processing and outputting, by the third two-way radio, a received voice packet when the received voice packet comprises the at least one selected from the first to Nth unique codes by the group selection button or the (N+1)th unique code.

* * * * *